UNITED STATES PATENT OFFICE.

CHARLES H. PERRIN, OF JEFFERSON CITY, MISSOURI.

TANNING PROCESS.

SPECIFICATION forming part of Letters Patent No. 387,597, dated August 7, 1888.

Application filed December 28, 1887. Serial No. 259,264. (Specimens.)

*To all whom it may concern:*

Be it known that I, CHARLES H. PERRIN, of Jefferson City, in the county of Cole and State of Missouri, have invented a new and useful Improvement in Tanning Hides or Skins, of which the following is a full, clear, and exact description.

My invention consists in treating—i. e., steeping—hides or skins in a decoction or infusion of the plant or shrub *Artemisia trideden-tata niger*, commonly known as "black sage-brush," as hereinafter described.

I intend to apply the process chiefly to depilated hides; but it may be applied before the hair or wool is removed.

In carrying out my invention I take the above-named shrub, preferably the leaves and small twigs thereof, which can be put up in bales for sale and use as hay or hops are baled, and which require no curing, and infuse the same in water in a close receptacle at a temperature from 150° to 175° Fahrenheit, more or less, and after thorough infusion allow the same to stand from thirty to sixty minutes, more or less, and then to cool down to about 100° or 110° Fahrenheit, when the decoction or tanning infusion is ready for use. This decoction may vary in strength.

A strong decoction or infusion is required for tanning heavy horse or cow hides, and hence I use about six ounces of the plant to one gallon of water. Weak decoctions or infusions suffice for tanning light and delicate lambskins, and in such case I put about two ounces of the plant to each gallon of water.

To tan the hides or skins, the same are limed or dehaired in the usual or any suitable manner; but no further treatment of them is necessary before introducing them to the tanning infusion hereinbefore described, and in which, at the reduced temperature named, they may be allowed to remain from three to eight days, more or less, according to the weight or thickness of the hides or skins. While in the tanning liquor or infusion, said hides or skins are turned or stirred at stated periods of time, preferably not less than once in twelve hours, the temperature being kept up to about 100° Fahrenheit, to insure rapid and good tanning; a much higher temperature still further quickening the tanning action, but diminishing the toughness of the product.

Practically I have found that for sheep or goat skins the same may be allowed to remain in the tanning vats or receptacles for from four to six days, according to their weight, while heavy horse or cow hides may remain from nine to twelve or even fourteen days.

Other tanning materials may be used in connection with the black sage-brush, if desired; but ordinarily I use the black sage-brush alone, and the foregoing description applies more particularly to such use of said shrub, which heretofore has been of little or no value, but rather a nuisance, but which treated substantially as described makes a strong, if not the strongest, tanning material of vegetable growth, and which is much cheaper than bark, while the leather produced by it, which may be subsequently dressed or finished by any of the known methods in common use, is stronger, tougher, and softer or more pliable and the process of production more rapid and cheaper than is practicable with other tanning materials.

Having thus fully described my invention, I claim as new and desire to secure by Letters Patent—

1. The within-described process of tanning hides or skins, which consists in steeping the same in an infusion of black sage-brush, substantially as specified.

2. In the manufacture of leather, steeping the hides or skins, after depilating, in an infusion of black sage-brush, substantially as specified.

3. In tanning hides or skins, steeping the same, after depilation, in a heated aqueous infusion of black sage-brush, substantially as specified.

4. The within-described process of tanning hides or skins, which consists in first depilating the hides or skins, then steeping them in an infusion of black sage-brush in water first heated to a high temperature and afterward allowed to stand and partially cool, and subsequently, while in said infusion, turning or stirring them at intervals, and finally removing them from the infusion for subsequent dressing or finishing, as set forth.

CHARLES H. PERRIN.

Witnesses:
A. ZNEUDT,
FRED PRINMEYER.